United States Patent [19]

Mascioli

[11] Patent Number: 4,983,218
[45] Date of Patent: Jan. 8, 1991

[54] COMPOSITION AND METHOD FOR HARDENING AN AQUEOUS ALKALI METAL SILICATE SOLUTION

[75] Inventor: Rocco L. Mascioli, Media, Pa.

[73] Assignee: Arco Chemical Technology, Inc., Wilmington, Del.

[21] Appl. No.: 405,255

[22] Filed: Sep. 11, 1989

[51] Int. Cl.$^5$ .............................................. C04B 28/26
[52] U.S. Cl. .................................. 106/600; 106/38.3; 106/38.35; 106/634; 106/632; 106/633; 106/635; 106/617
[58] Field of Search ................. 106/38.3, 84, 74, 28.35

[56] References Cited

U.S. PATENT DOCUMENTS

| | | | |
|---|---|---|---|
| 3,137,046 | 6/1964 | Barlow et al. | 22/193 |
| 4,056,937 | 11/1977 | Suzuki | 106/74 |
| 4,213,785 | 7/1980 | Blanc et al. | 106/38.35 |
| 4,233,076 | 11/1980 | Blanc et al. | 106/38.35 |

FOREIGN PATENT DOCUMENTS

| | | |
|---|---|---|
| 234936 | 1/1987 | Czechoslovakia . |
| 63-105092 | 5/1988 | Japan . |
| 2045777 | 11/1980 | United Kingdom . |

*Primary Examiner*—William R. Dixon, Jr.
*Assistant Examiner*—Melissa Bonner
*Attorney, Agent, or Firm*—Stephen D. Harper

[57] ABSTRACT

Aqueous solutions of alkali metal silicate are hardened using blends of alkylene carbonates and aliphatic alcohols such as alkylene diols, polyalkylene glycols, or hydroxyalkyl ethers. The aliphatic alcohol decreases the set time from that obtained using alkylene carbonate alone. The hardened alkali metal silicate compositions are useful as binders in the preparation of foundry molds or in other applications requiring agglomeration of particulate matter.

23 Claims, No Drawings

COMPOSITION AND METHOD FOR HARDENING AN AQUEOUS ALKALI METAL SILICATE SOLUTION

The present invention relates to hardener compositions suitable for hardening aqueous solutions of alkali metal silicates. The invention also pertains to binder compositions useful for binding particulate matter such as sand. The binder compositions may be used to prepare foundry molds and the like or to stabilize soil.

BACKGROUND OF THE INVENTION

Silicate-based compositions for binding particulate matter are well-known in the art. For example, U.S. Pat. No. 3,137,046 teaches the use of a binary mixture of an aqueous alkali metal silicate solution and a cyclic alkylene carbonate such as propylene carbonate to prepare foundry molds suitable for casting applications.

Many variations and refinements of alkylene carbonate/ silicate binder compositions have been developed in attempts to improve the curing characteristics or mechanical properties of such systems.

U.S. Pat No. 4,213,785 and Czech No. 234,936 teach the use of an alkyl or glycol ester of a carboxylic acid in combination with the alkylene carbonate and silicate to shorten the set time of the binder composition.

Brit. Pat. No. 2,045,777 teaches that the ability to recycle sand recovered from foundry molds is improved by the use of a high purity sugar with an alkylene carbonate hardener. The set time is not significantly affected by the sugar.

U.S. Pat. No. 4,233,076 teaches that extraction of the sand located within the cavities of a metal casting prepared using an alkylene carbonate/silicate binder is facilitated by the addition of a finely divided alumina, which acts as a demolding agent.

Jpn. Pat. No. 63-105092 teaches the use of mixtures of alkylene carbonates and carboxylic acids such as acetic acid in binder compositions. The set time is shortened by increasing the amount of carboxylic acid employed.

Due to productivity demands and the seasonal temperature changes which may occur in a foundry, excavation site, or other industrial setting, the ability to control set time is highly important. In particular, it is desirable to use a binder composition in which the reactivity can be readily adjusted as needed by variation of the relative proportions of the composition components. At the same time, the mechanical integrity of the foundry mold should not be compromised by these changes in binder composition. The components of the binder should be low in toxicity and odor so that the composition may be safely handled using ordinary precautions.

SUMMARY OF THE INVENTION

This invention provides a hardener composition suitable for hardening an aqueous solution of an alkali metal silicate. The hardener composition consists essentially of from about 40 to 99 weight percent of a cyclic alkylene carbonate having from 2 to 10 carbon atoms in the alkylene radical and from about 1 to 60 weight percent of an aliphatic alcohol having a hydroxyl number of from about 300 to 1850 meq/g KOH.

Also provided is a binder composition suitable for binding particulate matter. The binder composition is comprised of an aqueous solution of from about 10 to 90 weight percent of an alkali metal silicate and the hardener composition of this invention, wherein the weight ratio of the hardener composition to the aqueous solution is from about 1:1 to 1:99.

Foundry molds comprised of, in cured state, from 90 to 99.5 weight percent particulate refractory matter and from 0.5 to 10 weight percent of the binder composition of this invention are also provided.

This invention also furnishes a method for hardening an aqueous solution of an alkali metal silicate. The method comprises admixing the alkali metal silicate solution and the hardener composition of this invention.

The novel hardener compositions of this invention allow the set time of an alkali metal silicate solution to be decreased as desired by variation of the amount of aliphatic alcohol relative to alkylene carbonate. Foundry molds prepared using the hardener compositions of this invention have improved strength compared to molds prepared using only alkylene carbonate as a hardener.

DETAILED DESCRIPTION OF THE INVENTION

Suitable alkylene carbonates for use in the binder compositions of this invention include cyclic alkylene carbonates having from 2 to 10 carbon atoms in the alkylene radical. The alkylene carbonate is preferably water-soluble and has the general structure:

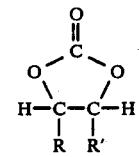

wherein R and R' are the same or different and are selected from the group consisting of hydrogen, methyl, and ethyl. Examples of suitable alkylene carbonates include, but are not limited to, ethylene carbonate and propylene carbonate as well as the cyclic carbonates of 1,3-propanediol, 1,2-butanediol, 1,3-butanediol, 1,4-butanediol, neopentyl glycol, glycerol, isobutylene glycol, and the like. Mixtures of alkylene carbonates can be used if desired. Propylene carbonate, ethylene carbonate, and their mixtures are the most preferred alkylene carbonates because of their availability and relatively low cost.

The aliphatic alcohols suitable for use in this invention are those compounds having hydroxyl numbers of from about 300 to 1850 meq/g KOH. Most preferably, the hydroxyl number is from about 500 to 1850 meq/g KOH. In general, the use of aliphatic alcohols having relatively high hydroxyl numbers will result in faster set times at a given aliphatic alcohol concentration. Water-soluble aliphatic alcohols are preferred. Aliphatic alcohols having one, two, three, or more hydroxyl groups per molecule may be employed, although monols and diols are preferred species. It is preferred that the hydroxyl groups be primary or secondary. Especially preferred aliphatic alcohols are those containing two or more oxygen atoms per molecule selected from the group consisting of alkylene diols, polyalkylene glycols, hydroxyalkyl ethers and their mixtures. Exemplary alkylene diols include, but are not limited to, ethylene glycol, 1,2-propylene glycol, 1,3propanediol, 1,2-butanediol, 1,3-butanediol, 1,4-butanediol, 2-methyl-1,3-propanediol, neopentyl glycol, isobutylene glycol, 1,6- hexanediol, 1,5-pentanediol, 1,2-pentanediol, 1,4-cyclohexanedimethanol, 1,2-cyclohexanediol, 1,4-cyclohexanediol, and the like. Suitable polyalkylene glycols include diethylene glycol, triethylene glycol, tetraethylene glycol, dipropylene glycol, tripropylene glycol, tetrapropylene glycol, as well as low (<500) molecular weight propoxylated or ethoxylated adducts of polyhydric alcohols such as glycerin, trimethylolpropane, pentaerythritol, 1,2,6-hexanetriol, sugars, sugar alcohols, and the like. Illustrative hydroxyalkyl ethers include compounds selected from the group consisting of $C_1$–$C_4$ alkyl mono ethers of ethylene glycol, diethylene glycol, propylene glycol, and dipropylene glycol and their mixtures. Specific examples of useful hydroxyalkyl ethers include ethylene glycol monobutyl ether, ethylene glycol monoethyl ether, ethylene glycol monomethyl ether, propylene glycol monomethyl ether, propylene glycol monoethyl ether, propylene glycol mono-t-butyl ether, and dipropylene glycol monomethyl ether. The aliphatic alcohol preferably does not contain a carboxylic acid or hydrolyzable carboxylic acid ester group.

The relative proportion of alkylene carbonate and aliphatic alcohol in the hardener composition is not critical and may be varied to achieve the particular set time desired. When aliphatic alcohols having relatively high hydroxyl numbers are employed, the amount of aliphatic alcohol necessary to realize a particular set time will generally be less than when low hydroxyl number aliphatic alcohols are used. Typically, the hardener composition will contain from about 40 to 99 weight percent of the cyclic alkylene carbonate and from about 1 to 60 weight percent of the aliphatic alcohol. More preferably, however, the alkylene carbonate is present in an amount of from about 75 to 97 weight percent and the aliphatic alcohol is present in an amount of from about 3 to 25 weight percent.

Any water-soluble alkali metal silicate may be used in the binder composition of the present invention; the alkali metal may be sodium, potassium, lithium, or the like. Sodium silicate (water glass) is the preferred alkali metal silicate, having the general formula $xSiO_2 \cdot yNa_2O$. Preferably, the ratio of x and y is from about 0.5:1 to about 3.75:1. Polysilicates (silicates in which the ratio of x:y is from about 4:1 to 25:1) may also be used. Minor amounts of other elements such as alkaline earth metals, halides, transition metals, aluminum, and the like may be present in the alkali metal silicate.

The concentration of alkali metal silicate in the aqueous solution is generally from about 10 to 90 weight percent, but more preferably is from about 30 to 60 weight percent. Solutions of this type are available from commercial sources.

The weight ratio of the hardener composition (alkylene carbonate+aliphatic alcohol) to the aqueous solution of alkali metal silicate is suitably from about 1:1 to 1:99. In general, however, ratios of from about 1:4 to 1:30 will be preferred.

The particles to be bound together by the binder composition of this invention may be comprised of any appropriate material. If a mold suitable for use in a casting application is to be prepared, the particles are preferably of a refractory material such as silica, alumina, silicon carbide, magnesite, dolomite, aluminum silicate, mullite, carbon, forsterite, chrome ore-magnesite, zirconia, and the like. Particles of earth, clay, sand, or soil may also be agglomerated using the binder compositions of the present invention. In the preparation of a foundry mold, the particles will normally comprise from about 90 to 99.5 percent (preferably, from about 95 to 98.5 percent) of the total weight of the mold while the binder composition will comprise from about 0.5 to 10 percent (preferably, from about 1.5 to 5 percent) of the total weight. Similar ratios are also appropriate for use in stabilizing soil using the binder compositions of this invention.

The order in which the components of the binder composition are combined with each other and with the particulate matter is not critical. In preparing a foundry mold, however, it will typically be most convenient to mix the hardener composition (alkylene carbonate+aliphatic alcohol) with the particulate matter before adding the aqueous alkali metal silicate solution. The molding process is typically carried out at ambient temperatures (i.e., from about 0° C. to 50° C.) but if desired the mixture may be heated to any appropriate temperature. One of the primary advantages of this invention is the ability to adjust the set time as desired in response to fluctuating ambient temperatures. In general, it is desirable to have a set time of from about 30 seconds to 20 minutes. Set time is defined a that period of time which intervenes between the moment that the particulate matter, alkali metal silicate solution, and hardener composition are mixed to that point in time when it is no longer possible to readily modify the surface of the agglomerated particles by exerting pressure on that surface.

The binder compositions of this invention may also be used to consolidate or stabilize soil by injection or impregnation of the soil with the binder composition. In this manner, soil which is loose or highly pervious to water may be hardened or made more water-tight. Such methods (commonly referred to as chemical grouting) are highly useful in foundation or underground excavation work, the construction of dams and banks, land filling operations, erosion control, and the like. Chemical grouting methods using silicate-based binders are well-known in the art and are described in "Chemical Grouts" *Kirk-Othmer Encyclopedia of Chemical Technology* Vol. 5, p. 368, Wiley-Interscience (1979), the teachings of which are incorporated herein by reference.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate this invention, but are not limitative of the invention in any manner whatsoever.

EXAMPLES 1-15

A beaker was charged with 50 g of a commercial sodium silicate solution (45% solids; $SiO_2:Na_2O=2.4$). A hardener (5.0g) was then added and the mixture stirred continuously at room temperature by hand until the solution solidified. The hardener used was either propylene carbonate alone (as in Comparative Example 1) or a mixture of propylene carbonate and another organic compound as shown in Table I. The set time given in Table I for each example is the time elapsed between addition of the hardener and solidification of the solution.

Alkylene diols such as ethylene glycol, propylene glycol, and 1,4-butanediol (Examples 2, 3, 11, and 12), polyalkylene glycols such as dipropylene glycol and tripropylene glycol (Examples 4, 5, and 12), and hydroxyalkyl ethers such as propylene glycol monomethyl ether and dipropylene glycol monomethyl ether (Examples 8 and 9) were found to be quite effective in reducing the set time when mixed at a 10-15 weight percent level with propylene carbonate. However, little or no effect on set time was observed using higher molecular weight polyalkylene glycols (400 MW polypropylene glycol diol and 1500 MW polypropylene glycol triol) or hydroxyalkyl ethers (tripropylene glycol monomethyl ether) at similar concentrations. Comparative Examples 14 and 15 demonstrate that compounds having no free hydroxyl functionality do not act as accelerators in combination with propylene carbonate.

TABLE I

| Example No. | 1* | 2 | 3 | 4 | 5 | 6* | 7* | 8 | 9 | 10* | 11 | 12 | 13 | 14* | 15* |
|---|---|---|---|---|---|---|---|---|---|---|---|---|---|---|---|
| Alkylene Carbonate | PC | PC | PC | PC | PC | PC | PC | PC | PC | PC | PC | PC | PC | PC | PC |
| Wt. % | 100 | 85 | 85 | 85 | 85 | 85 | 85 | 85 | 85 | 85 | 85 | 90 | 90 | 85 | 85 |
| Aliphatic Alcohol | — | EG | PG | DPG | TPG | PPG-400 | PPG-1500 | PM | DPM | TPM | BD | PG | DPG | PMA | DPMA |
| Hydroxyl No., meq/g | — | 1810 | 1480 | 836 | 584 | 280 | 112 | 623 | 379 | 272 | 1250 | 1480 | 836 | 0 | 0 |
| Wt., % | 0 | 15 | 15 | 15 | 15 | 15 | 15 | 15 | 15 | 15 | 15 | 10 | 10 | 15 | 5 |
| Set Time (seconds) | 540 | 345 | 140 | 260 | 420 | 525 | 570 | 305 | 440 | 555 | 160 | 245 | 320 | 545 | 590 |

Abbreviations
PC = propylene carbonate
EG = ethylene glycol
PG = propylene glycol
DPG = dipropylene glycol
TPG = tripropylene glycol
PPG-400 = 400 MW polypropylene glycol diol
PPG-1500 = 1500 MW polypropylene glycol triol
PM = propylene glycol monomethyl ether
DPM = dipropylene glycol monomethyl ether
TPM = tripropylene glycol monomethyl ether
BD = 1,4-butanediol
PG = 1,2-propylene glycol
PMA = propylene glycol monomethyl ether acetate
DPMA = dipropylene glycol monomethyl ether acetate
*Comparative example

EXAMPLES 16-22

To demonstrate the control of set time which is possible using the hardener compositions of this invention, a series of runs was performed using the procedure described in Examples 1-15 (100 g sodium silicate solution; 10 g hardener) and varying proportions of propylene carbonate and propylene glycol. Table II shows that the set time under these conditions may be readily varied between about half a minute and ten minutes. The use of propylene glycol alone (Comparative Example 22) gave a semi-solid product not suitable for use as a binder.

EXAMPLES 23-25

The advantages of using alkylene carbonate/aliphatic alcohol blends as hardener compositions over alkylene carbonate alone are illustrated by these examples (Table III). The hardener (0.45 g) was mixed with 300 g sand. Sodium silicate solution (9.0 g; 45% solids; SiO$_2$:Na$_2$O=2.4) was then added to the sand mixture before pouring the mixture into a dog-bone mold and allowing the mixture to set at room temperature. Not only was set time accelerated by increasing the proportion of propylene glycol, but the tensile strength also increased significantly.

Field testing of a 85% propylene carbonate/15% propylene glycol hardener blend gave a molded specimen having a tensile strength of 100 psi compared to only 64 psi using a 50/50 blend of ethylene carbonate/propylene carbonate.

TABLE II

| Example No. | 16* | 17 | 18 | 19 | 20 | 21 | 22* |
|---|---|---|---|---|---|---|---|
| Wt. % Propylene Carbonate | 100 | 95 | 90 | 85 | 80 | 50 | 0 |
| Wt. % Propylene Glycol | 0 | 5 | 10 | 15 | 20 | 50 | 100 |
| Set Time (seconds) | 595 | 385 | 265 | 165 | 130 | 33 | 15 |

*Comparative example

TABLE III

| Example No. | 23 | 24 | 25* |
|---|---|---|---|
| Wt. % Propylene Carbonate | 85 | 90 | 100 |
| Wt. % Propylene Glycol | 15 | 10 | 0 |
| Set Time (seconds) | 406 | 615 | 818 |
| Tensile strength, psi | 83.0 | 71.0 | 50.9 |

*Comparative example

I claim:

1. A hardener composition suitable for hardening an aqueous solution of an alkali metal silicate with reduced set time, said composition consisting essentially of
   (a) from about 40 to 99 weight percent of a cyclic alkylene carbonate having from 2 to 10 carbon atoms in the alkylene radical; and
   (b) from about 1 to 60 weight percent of an aliphatic alcohol having a hydroxyl number of from about 300 to 1850 meq/g KOH; wherein the amount of the aliphatic alcohol is effective to reduce the set time of the aqueous solution of alkali metal silicate as compared to the set time observed in the absence of the aliphatic alcohol.

2. The hardener composition of claim 1 wherein the cyclic alkylene carbonate has the general structure

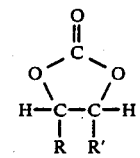

wherein R and R' are the same or different and are selected from the group consisting of hydrogen, methyl, and ethyl.

3. The hardener composition of claim 2 wherein R is hydrogen and R' is methyl.

4. The hardener composition of claim 1 wherein the aliphatic alcohol is selected from the group consisting of alkylene diols, polyalkylene glycols, hydroxyalkyl ethers, and mixtures thereof.

5. The hardener composition of claim 4 wherein the alkylene diol is selected from the group consisting of ethylene glycol, propylene glycol, 1,3-propanediol, butanediols, pentanediols, hexanediols, neopentyl glycol, 2-methyl-1,3-propanediol, and mixtures thereof.

6. The hardener composition of claim 5 wherein the polyalkylene glycol is selected from the group consisting of diethylene glycol, triethylene glycol, tetraethylene glycol, dipropylene glycol, tripropylene glycol, tetrapropylene glycol, and mixtures thereof.

7. The hardener composition of claim 5 wherein the hydroxyalkyl ether is selected from the group consisting of $C_1$-$C_4$ alkyl ethers of ethylene glycol, diethylene glycol, propylene glycol, dipropylene glycol and their mixtures.

8. The hardener composition of claim 1 wherein the aliphatic alcohol has a hydroxyl number of from about 550 to 1850 meq/g KOH.

9. The hardener composition of claim 1 wherein the composition consists essentially of from about 75 to 97 weight percent of the cyclic alkylene carbonate and from about 3 to 25 weight percent of the aliphatic alcohol.

10. A hardener composition suitable for hardening an aqueous solution of sodium silicate with reduced set time, said composition consisting essentially of:
(a) from about 75 to 97 weight percent of a cyclic alkylene carbonate having the general structure

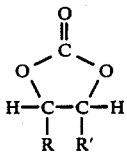

wherein R and R' are the same or different and are selected from the group consisting of hydrogen, methyl, and ethyl, and
(b) from about 3 to 25 weight percent of an aliphatic alcohol having a hydroxyl number of from about 550 to 1800 meq/g KOH selected from the group consisting of alkylene diols, polyalkylene glycols, hydroxyalkyl ethers, and mixtures thereof;
wherein the amount of the aliphatic alcohol is effective to reduce the set time of the aqueous solution of sodium silicate as compared to the set time observed in the absence of the aliphatic alcohol.

11. The hardener composition of claim 10 wherein R is hydrogen and R' is methyl or hydrogen.

12. The hardener composition of claim 10 wherein the aliphatic alcohol is an alkylene diol selected from the group consisting of ethylene glycol, propylene glycol, 1,3-propanediol, butanediols, pentanediols, hexanediols, neopentyl glycol, 2-methyl-1,3-propanediol, and mixtures thereof.

13. The hardener composition of claim 12 the alkylene diol is propylene glycol.

14. The hardener composition of claim 10 wherein the aliphatic alcohol is a polyalkylene glycol selected from the group consisting of diethylene glycol, triethylene glycol, tetraethylene glycol, dipropylene glycol, tripropylene glycol, tetrapropylene glycol, and mixtures thereof.

15. The hardener composition of claim 11 wherein the aliphatic diol is a hydroxyalkyl ether selected from the group consisting of $C_1$-$C_4$ alkyl mono ethers of ethylene glycol, diethylene glycol, propylene glycol, dipropylene glycol and their mixtures.

16. A binder composition suitable for binding particulate matter with reduced set time, said binder composition comprising:
(a) an aqueous solution of from about 10 to 90 weight percent of an alkali metal silicate; and
(b) a hardener composition consisting essentially of
(i) from about 40 to 99 weight percent of a cyclic alkylene carbonate having from 2 to 10 carbon atoms in the alkylene radical; and
(ii) from about 1 to 60 weight percent of an aliphatic alcohol having a hydroxyl number of from about 300 to 1850 meq/g KOH;
wherein the weight ratio of the hardener composition to the aqueous solution is from about 1:1 to 1:99 and wherein the amount of the aliphatic alcohol is effective to reduce the set time of the aqueous solution of alkali metal silicate as compared to the set time observed in the absence of the aliphatic alcohol.

17. A binder composition suitable for binding particulate matter with reduced set time, said binder composition comprising:
(a) an aqueous solution of from about 30 to 60 weight percent sodium silicate; and
(b) a hardener composition consisting essentially of
(i) from about 75 to 97 weight percent of a cyclic alkylene carbonate having the general structure

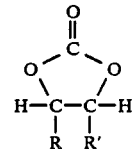

wherein R and R' are the same or different and are selected from the group consisting of hydrogen, methyl, and ethyl; and
(ii) from about 3 to 25 weight percent of an aliphatic alcohol having a hydroxyl number of from about 550 to 1850 meq/g KOH selected from the group consisting of alkylene diols, polyalkylene glycols, hydroxyalkyl ethers, and mixtures thereof;
wherein the weight ratio of the hardener composition to the aqueous solution is from about 1:4 to 1:30 and wherein the amount of the aliphatic alcohol is effective to reduce the set time of the aqueous solution as compared to the set time observed in the absence of the aliphatic alcohol.

18. A foundry mold comprising in cured state:
(a) a plurality of particles of a refractory material, the weight of said particles being from about 90 to 99.5 percent of the total weight of the foundry mold;
(b) an aqueous solution of from about 10 to 90 weight percent of an alkali metal silicate; and
(c) a hardener composition consisting essentially of (i) from about 40 to 99 weight percent of a cyclic alkylene carbonate having from 2 to 10 carbon atoms in the alkylene radical; and (ii) from about 1 to 60 weight percent of an aliphatic alcohol having a hydroxyl number of from about 300 to 1850 meq/g KOH;

wherein the weight ratio of the hardener composition to the aqueous solution is from about 1:1 to 1:99 and the combined weight of the aqueous solution and hardener composition is from about 0.5 to 10 percent of the total weight of the foundry mold.

19. A foundry mold comprising, in cured state:
(a) a plurality of particles of a refractory material, the weight of said particles being from about 95 to 98.5 percent of the total weight of the foundry mold;
(b) an aqueous solution of from about 30 to 60 weight percent sodium silicate; and
(c) a hardener composition consisting essentially of
(i) from about 75 to 97 weight percent of a cyclic alkylene carbonate having the general structure

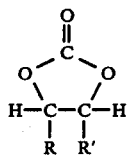

wherein R and R' are the same or different and are selected from the group consisting of hydrogen, methyl, and ethyl; and
(ii) from about 3 to 25 weight percent of an aliphatic alcohol having a hydroxyl number of from about 550 to 1850 meq/g KOH selected from the group consisting of alkylene diols, polyalkylene glycols, hydroxyalkyl ethers, and mixtures thereof;

wherein the weight ratio of the hardener composition to the aqueous solution is from about 1:4 to 1:30 and the combined weight of the hardener composition and aqueous solution is from about 1.5 to 5 percent of the total weight of the foundry mold.

20. A method of hardening an aqueous solution of from about 10 to 90 weight percent of an alkali metal silicate with reduced set time, said method comprising:
(a) forming a mixture of the aqueous solution of the alkali metal silicate and
a hardener composition consisting essentially of
(i) from about 40 to 99 weight percent of a cyclic alkylene carbonate having from 2 to 10 carbon atoms in the alkylene radical; and
(ii) from about 1 to 60 weight percent of an aliphatic alcohol having a hydroxyl number of from about 300 to 1850 meq/g KOH;
wherein the weight ratio of the hardener composition to the aqueous solution is from about 1:1 to 1:99; and
(b) allowing the mixture to harden;
wherein the amount of the aliphatic alcohol used is effective to reduce the set time of the mixture as compared to the set time observed in the absence of the aliphatic alcohol.

21. A method of hardening an aqueous solution of from about 30 to 60 weight percent sodium silicate with reduced set time, said method comprising:
(a) forming a mixture of the aqueous solution of sodium silicate and
a hardener composition consisting essentially of
(i) from about 75 to 97 weight percent of a cyclic alkylene carbonate having the general structure

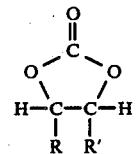

where R and R' are the same or different and are selected from the group consisting of hydrogen, methyl, and ethyl; and
(ii) from about 3 to 25 weight percent of an aliphatic alcohol having a hydroxy number of from about 550 to 1850 meq/g KOH selected from the group consisting of alkylene diols, polyalkylene glycols, hydroxyalkyl ethers, and mixtures thereof;
wherein the weight ratio of the hardener to the aqueous solution is from about 1:4 to 1:30; and
(b) allowing the mixture to harden at a temperature between about 0° C. and 50° C. for a period of time between about 15 seconds and 15 minutes;
wherein the amount of the aliphatic alcohol used is effective to reduce the set time of the mixture as compared to the set time of the mixture observed in the absence of the aliphatic alcohol.

22. A method of binding particulate matter with reduced set time comprising
(A) forming a mixture of
(a) said particulate matter, wherein the weight of said particulate matter is from about 90 to 99.5 percent of the weight of the mixture;
(b) an aqueous solution of from about 10 to 90 weight percent of an alkali metal silicate; and
(c) a hardener composition consisting essentially of
(i) from about 40 to 99 weight percent of an alkylene carbonate having from 2 to 10 carbon atoms in the alkylene carbonate; and
(ii) from about 1 to 60 weight percent of an aliphatic alcohol having a hydroxyl number of from about 300 to 1850 meq/g KOH;
wherein the weight ratio of the hardener composition to the aqueous solution is from about 1:1 to 1:99 and the combined weight of the aqueous solution and hardener composition is from about 0.5 to 10 percent of the weight of the mixture; and
(B) allowing the mixture to harden;
wherein the amount of the aliphatic alcohol is effective to reduce the set time of the mixture as compared to the set time observed in the absence of the aliphatic alcohol.

23. A method of binding particulate refractory matter with reduced set time comprising
(A) forming a mixture of
(a) said particulate refractory matter, wherein the weight of said particulate refractory matter is from about 95 to 98.5 percent of the total weight of the mixture;
(b) an aqueous solution of from about 30 to 60 weight percent sodium silicate; and
(c) a hardener composition consisting essentially of
(i) from about 75 to 97 weight percent of a cyclic alkylene carbonate having the general structure

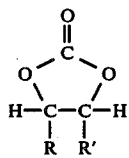

wherein R and R' are the same or different and are selected from the group consisting of hydrogen, methyl, and ethyl; and (ii) from about 3 to 225 weight percent of an aliphatic alcohol having a hydroxyl number of from about 550 to 1850 meq/g KOH selected from the group consisting of alkylene diols, polyalkylene glycols, hydroxyalkyl ethers, and mixtures thereof;

wherein the weight ratio of the hardener composition to the aqueous solution is from about 1:4 to 1:30 and the combined weight of the hardener composition and aqueous solution is from about 1.5 to 5 percent of the total weight of the mixture; and (B) allowing the mixture to harden at a temperature between about 0° C. and 50° C. for a period of time between about 15 second and 15 minutes;

wherein the amount of the aliphatic alcohol used is effective to reduce the set time of the mixture as compared to the set time of the mixture observed in the absence of the aliphatic alcohol.

* * * * *